United States Patent

[11] 3,603,951

| [72] | Inventors | Pat O. Bracken<br>San Diego, Calif.;<br>George H. Lane, St. Louis, Mo. |
|---|---|---|
| [21] | Appl. No. | 756,819 |
| [22] | Filed | Sept. 3, 1968 |
| [45] | Patented | Sept. 7, 1971 |
| [73] | Assignee | Montech Incorporated<br>Bridgeton, Mo. |

[54] STORM WARNING SYSTEM
9 Claims, 15 Drawing Figs.

[52] U.S. Cl. .................................................. 340/224,
73/170 R, 325/64, 325/113, 340/182, 340/201 R,
340/421
[51] Int. Cl. .................................................... G08b 25/00,
G08b 19/00
[50] Field of Search ........................................... 325/55, 64,
54, 51, 67, 113; 340/224, 420, 263, 421, 220, 220
D, 212, 182, 201, 203, 177; 73/170

[56] References Cited
UNITED STATES PATENTS

| 2,976,522 | 3/1961 | Dowling | 340/220 |
| 2,318,646 | 5/1943 | White | 340/201 X |
| 2,402,688 | 6/1946 | Skurnick | 340/212 |
| 2,444,106 | 6/1948 | Miles | 340/182 X |
| 2,637,841 | 5/1953 | Davis et al. | 340/212 |
| 2,642,564 | 6/1953 | Stevens | 340/201 |
| 2,684,474 | 7/1954 | Kass | 340/212 |
| 3,026,501 | 3/1962 | Gray | 340/182 |

OTHER REFERENCES

Popular Science, 10 1961, pp. 102–103
Popular Electronics, 4 1962, pp. 50

Primary Examiner—Robert L. Richardson
Attorney—Kingsland, Rogers, Ezell, Eilers & Robbins ABSTRACT: A public warning system for alerting the public of natural disasters, such as tornadoes and other severe atmospheric disturbances, and having capabilities of giving general warning for civil defense for other emergencies. The system also has the capability to act as a sensor grid to obtain scientific atmospheric or weather or other geophysical data. A unique grid detection system is provided that predetermines and selects the area that will be affected and which residential areas will lie in the path of an approaching tornado. A selective warning of the affected residents is provided by sensor transmitters located in the grid at spaced grid points along the prevailing tornado's track and to some safe distance along each side of the trace by signaling individual receiver alarm devices. The automatic alarm network is self-sustaining and is not dependent upon existing power distribution systems for its actuation.

PATENTED SEP 7 1971
3,603,951
SHEET 1 OF 7
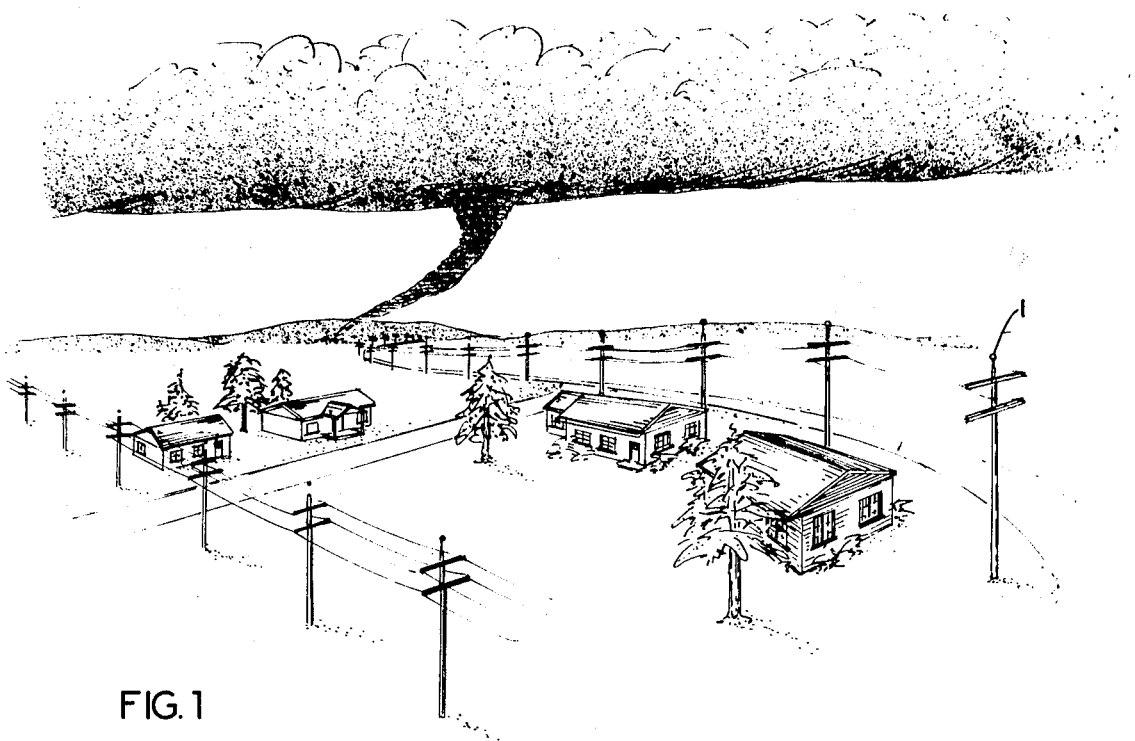
FIG. 1
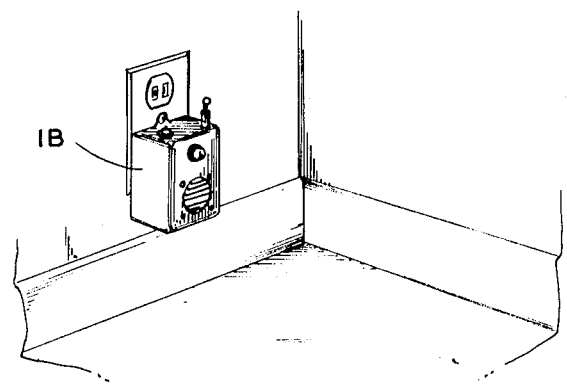
FIG. 2
FIG. 3
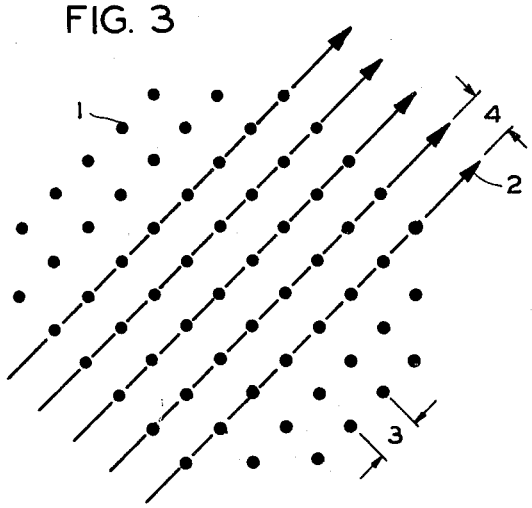
INVENTORS
PAT O. BRACKEN
GEORGE H. LANE
BY *Kingsland, Rogers,*
*Ezell, Eilers & Robbins*
ATTORNEYS

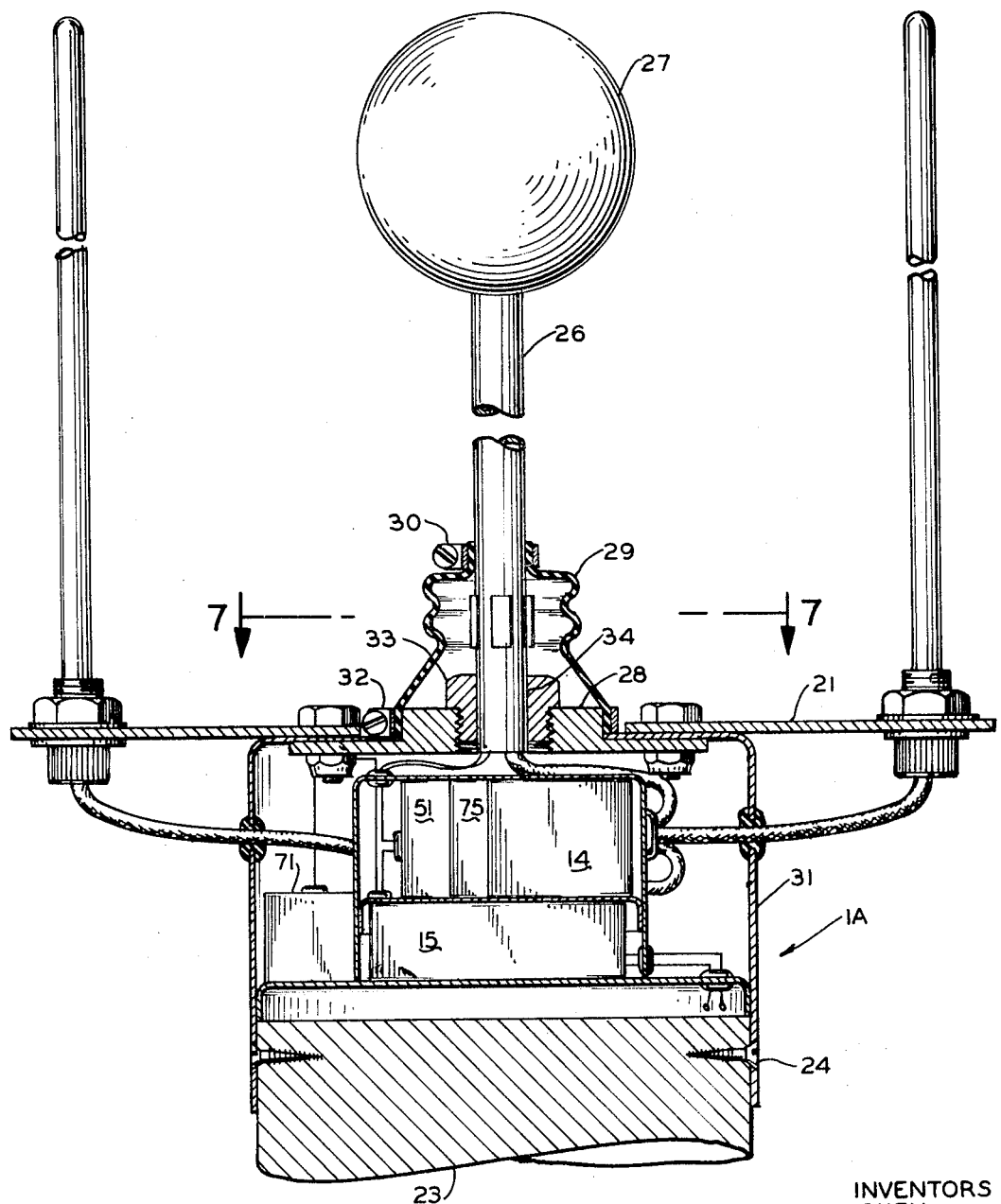

THRESHOLD AMPLIFIER

SENSOR LOGIC GATE

PREAMPLIFYING STAGE

INVENTORS
PAT O. BRACKEN
GEORGE H. LANE
BY Kingsland, Rogers,
Ezell, Eilers & Robbins
ATTORNEYS INVENTORS
PAT O. BRACKEN
GEORGE H. LANE
BY Kingsland, Rogers,
Ezell, Eilers & Robbins
ATTORNEYS

STORM WARNING SYSTEM

SUMMARY OF THE INVENTION

One of the most dreadful disasters that can occur is a tornado striking a thickly populated area without warning. An adequate warning of approaching tornadoes would enable residents to take precautions and seek shelter. Such a warning is needed by the public day and night, and would reduce the injury and loss of lives caused by the storms.

This invention comprises a plurality of sensor transmitters, hereinafter referred to as S/T, aligned in a grid network with sensors that detect, analyze and actuate fixed frequency transmitters, on a selective basis, providing a frequency modulation, hereinafter referred to as FM, carrier signal which is radiated to the individual alarm receivers which initiate the warning signal for the public.

This invention has the capability to provide for a tornado warning system using independent, automatic, self-sustaining sensor transmitter arranged in a grid pattern throughout the protected area and receiver alarms located in homes, businesses public buildings, aircraft installations and schools. The receiver alarms are activated by the S/T unit as a tornado penetrates the protected area. Although this invention is described for purpose of example as a tornado warning system, it will be apparent that it can be used to detect other atmospheric conditions, to collect atmospheric data, including temperature, humidity, wind velocity, barometric pressure, cloud cover, radiation, and the like, and can be used as a civil defense warning system.

The primary objects of the invention are to provide a unique grid detection system that predetermines and selects the area that will be affected and which residential areas will lie in the path of an approaching tornado or other atmospheric disturbance; to provide the selective warning of the affected residents by sensor transmitters located in a grid along the prevailing tornado's track, and to some safe distance along each side of said track by alerting individual receiver alarm devices; to provide a self-sustaining, automatic alarm network that is not dependent on existing power distribution systems for its actuation; and also provide a clear unmistakable warning, day or night, for tornadoes detected along these prevailing storm tracks as determined by the grid network.

Other objects and advantages of the invention will become apparent from the following detailed description and will be otherwise apparent to those skilled in the art. For the purpose of illustration of this invention, there is shown in the accompanying drawings a preferred embodiment thereof. It is to be understood that these drawings are for the purpose of example only and that the invention is not limited thereto.

In the drawings:

FIG. 1 is a pictorial view of an area incorporating the invention;

FIG. 2 is a pictorial view of a receiver alarm installed in a home;

FIG. 3 is a schematic view of the grid detection system arrangement;

FIG. 6 is an elevational view partly in section of the sensor transmitter unit modified to use strain gage sensors for determining wind velocity;

FIG. 7 is a sectional view taken along line 7—7 of FIG. 6 showing strain gages;

This invention is embodied in the installation of a plurality of sensor transmitters 1 and home alarm receivers 1B situated in a unique network covering a specific, preselected area, illustrated by FIG. 1, which will, after detecting a tornado, provide a selective warning to home receivers of the path of the oncoming tornado. FIG. 2 shows a view of a receiver alarm 1B installed in a home. FIG. 3 illustrates a typical grid network incorporating sensor transmitters 1. The grid array is established by a statistical analysis of recorded tornado tracks such as shown in Tech. Paper 020, Tornado Occurrences in U.S., U.S. Dept. of Commerce. Such analysis provides a predominate track direction 2 with respect to local latitude which is utilized to align the sensor transmitter grid network. Sensor transmitter spacing along a grid track 3 is determined by the nominal transmitter operating range that will assure reception by the next adjacent sensor transmitter along the same track and by the probability of storm detection desired.

Cross track sensor transmitter spacing 4 is also determined by the probability of storm detection desired and by the requirement of providing adequate sensor density to give a true selection warning to the home alarm receivers while providing a quick determination of a wandering tornado not following the prevailing storm track impinging on the next closely spaced track. In any event, spacing 4 cannot be greater than two times the tornado detection radius of the sensor transmitter units.

Figure 4:
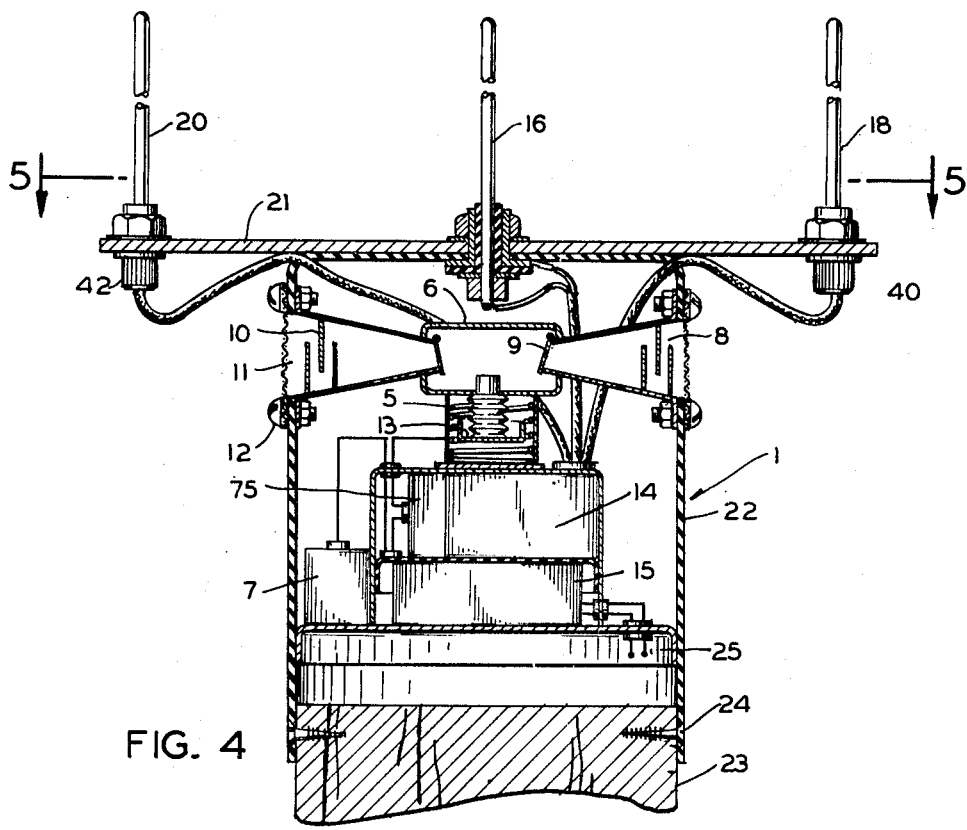
FIG. 4 is an elevational view partly in section of the sensor transmitter unit using dynamic pressure sensing device for determining wind velocity and static barometric pressure.
Figure 5:
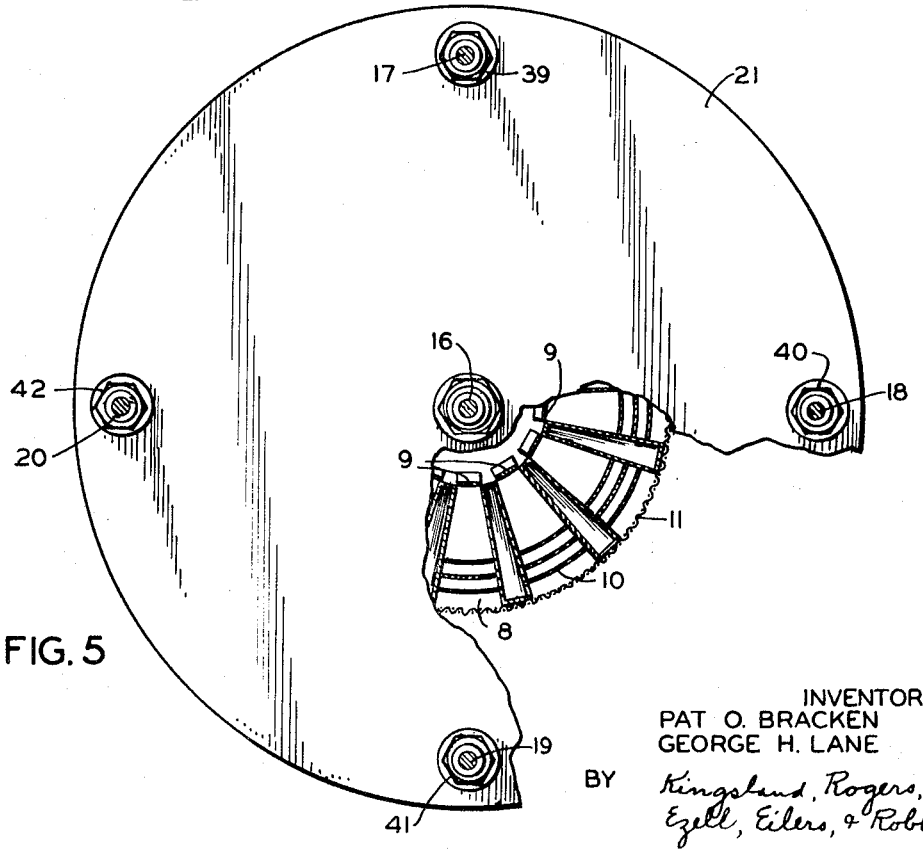
FIG. 5 is a partly sectional view taken along the line 5—5 of FIG. 4.

FIGS. 4 and 5 provides a detailed view of a sensor transmitter unit 1 that comprises a pressure sensor 5 that measures the pressure build up in chamber 6 resulting from the local winds with relation to the local static pressure as determined by the barometer pressure sensor 7. Chamber 6 is pressurized through a plurality of ports 8 to the ends of which are attached a flapper type check valve 9 allowing pressure build up in the sensing chamber 6. The entrance to these ports 8 incorporates baffles 10 to prevent rain and snow from flowing into the sensing chamber 6. The ports 8 also incorporate at their entrance a screen 11 attached by screws 12 to block foreign objects from entering. When the wind velocity from any direction impinges on any port 8, the pressure increases because of the wind velocity and unseats the check valve 9 thereby pressurizing chamber 6. This increase in pressure depresses the wind sensing bellows 5 which is attached to an electrical transducer 13 resulting in a change in the transducer 13 electrical output. This transducer change provides an output voltage that is proportional to the wind velocity being measured. The transducer is connected to the input of threshold amplifying device 75 to be later described. The local barometric pressure sensor 7 is also an electrical transducer and provides an output voltage that is proportional to the local statis pressure. It also is connected to the threshold amplifying device 75. When the critical combination of local pressure and wind velocity indication are present at the input of transceiver 14 is broadcasts a fixed frequency using the quarter wave antenna array system 16, 17, 18, 19, 20 attached to the ground plane 21, which provides directional signal propagation. This system derives its power from a battery power system 15. All of the components of the sensor transmitter are enclosed within a housing 22 which has provisions for attachment to a rigid support post 23 by fasteners 24. An external power source is connected to terminals 25 which supply external power to the battery's system 15. FIG. 6 illustrates a modified sensor transmitter unit 1A that also incorporates both pressure and wind velocity sensing features. This unit is comprised of an antenna system which includes a sensing whip antenna 26 incorporating a drag producing device 27 securely attached to a mounting bracket 28. The remaining four antennas 17, 18, 19, 20 are securely attached to the ground plane 21 as shown in FIG. 5. A protective flexible boot 29 is securely attached to whip antenna 26 by clamp 30 and the housing 31 by a clamp 32. The housing 31 encloses all the components previously described for embodiment 1 shown in FIGS. 4 and 5, which is comprised of transceiver 14, barometric sensor 7, battery system 15 and threshold amplifying system 75. The housing 31 also has provisions for mounting to structure 23 by fasteners 24.

FIG. 7 provides a closer look at the details of the sensor transmitter wind velocity sensing unit. In FIG. 6 antenna 26 is attached rigidly to mount 28 by a threaded sleeve attachment 33 to which antenna 26 is bonded at 34. Antenna 26 is provided with four resistance type strain gages 35, 36, 37, 38. A view of the strain gage arrangement is illustrated in FIG. 7. These gages provide the wind velocity sensing network for the sensor transmitter unit 1A by the variation of their resistance as the antenna 26 is strained by the bending force of the wind. When the antenna is deflected as the result of wind impinging on the antenna 26 and the drag sphere 27, the strain gages 35, 36, 37 and 38 detect the change in surface stresses of the antenna 26. These stresses are converted into electrical signals which are a direct correlation between the wind velocity and the resistance across the strain gages 35, 36, 37 and 38 outputs.

FIGS. 4 and 5 are views taken showing the antenna array system installation. They illustrate the positions of the elements 16, 17, 18, 19 and 20 in a vertical array. The driven element 16 is located in the center; all other elements are located in pairs diametrically opposed and at right angles to each other. The driven element and element 17 are aligned with the prevailing storm track. The antenna elements 17, 18, 19 and 20 are mounted in coaxial connectors 39, 40, 41 and 42. The antenna element coax connector assemblies are then installed on a metal ground plane 21 as shown in FIG. 5. All elements are electrically insulated from the ground plane 21.

Figures 10, 12:
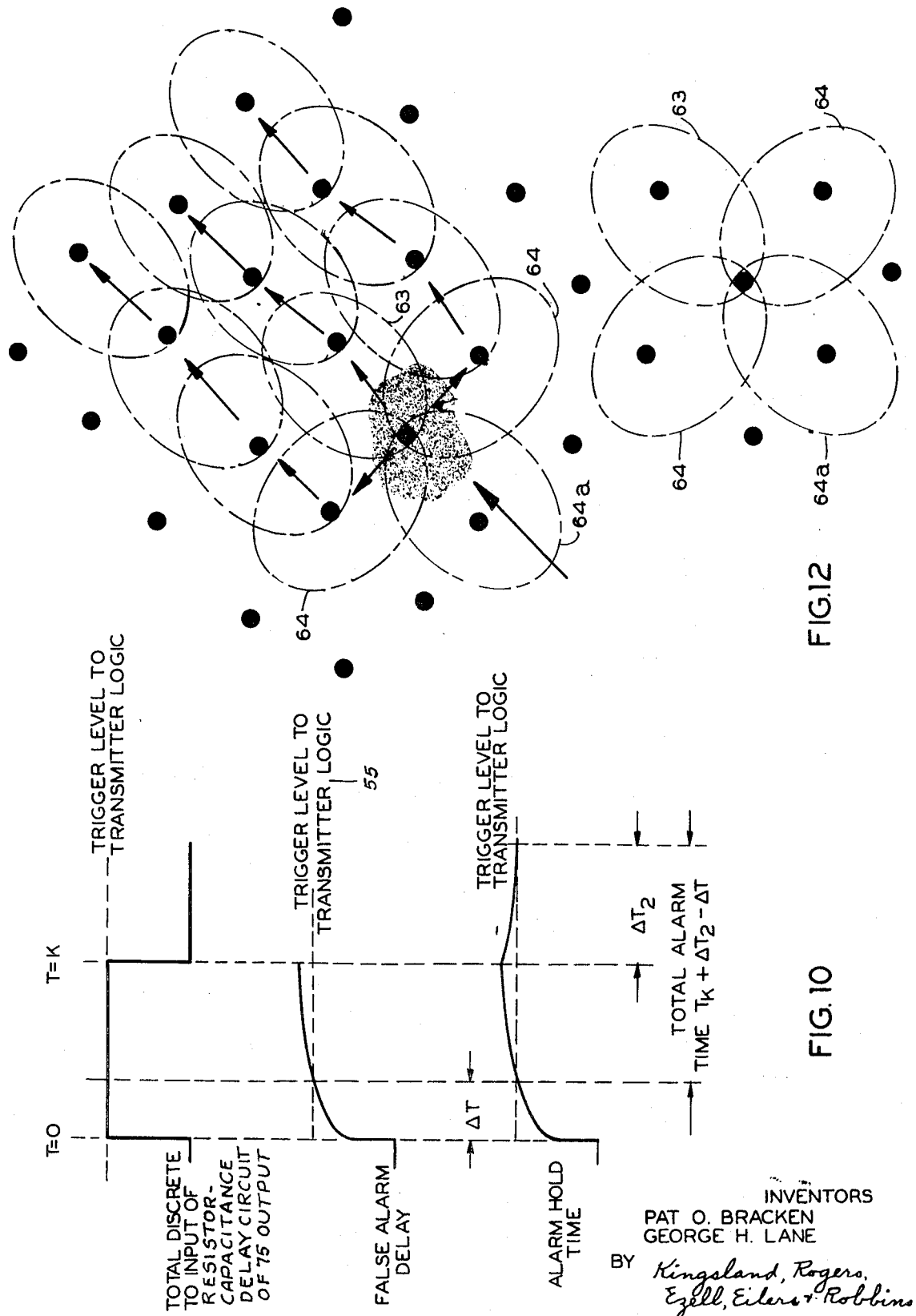
FIG. 10 is a diagrammatic view which illustrates the total alarm discrete pulse.
FIG. 12 is a diagrammatic view of the relay transmission and receiver patterns of the S/T.

The driven elements 26, of FIGS. 6 and 16, of FIG. 4 shown in both S/T configurations are used to transmit and receive the RF alert signals from the grid system shown in FIG. 3. The other elements 17, 18, 19 and 20 are antenna parasites which are used to direct the alert transmissions to the adjacent track sensor transceivers and home receivers as shown in FIG. 12 to be discussed later.

All elements, in the array, are connected to the ground plane through RF components. The driven elements 16 and 26 are connected to the transceiver 14 output which is, in turn, terminated at the ground plane 21. The parasitic elements 17, 18, 19 and 20 are connected to RF coils 43, 44, 45 and 46, shown in FIG. 11, and to the output of the antenna logic 47 shown in FIG. 8. The opposite ends of the coils are also terminated in antenna logic 47.

Figure 8:
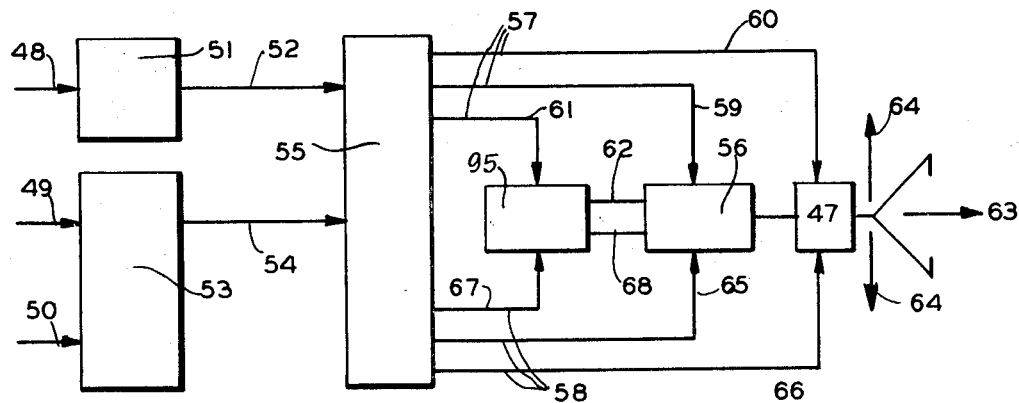
FIG. 8 is a functional block diagram of the sensor transmitter.

FIG. 8 is a block diagram illustrating the flow of the three possible storm alert input signals; alert from sensed storm signature 48, an RF alert signal from a long track alarm transmitter 49, and RF alert signal from a cross track transmitter of grid system 50.

The alert signal from the storm signature sensors 35, 36, 37, 38 strain gages or the resulting signal from transducer 13, and the barometric pressure signal 7 are processed through a signal conditioning and amplifier system 51 and 75 to establish a total storm alert discrete 52. The RF signal alerts 49 and 50 are processed through receiver detectors 53 to produce up track commands 54. The total alert discrete 52 enables both up track and cross track transmission of the alert signal.

Both the alert signals 52 and 54 are provided to the transmitter logic 55 for enabling the transmitter 56 to operate in one of two modes. Mode 1, the storm present mode 57 or mode 2, storm alert present mode 58. Mode 1 operation provides FM transmission relay to both cross track and down track RF receivers. Mode 1 logic provides a transmitter enabling signal 59, an antenna array switching signal 60, together with a modulator control signal 61 to code the transmitter 56 from the modulator 95 with storm present tone 62 and transmit the alert both along track 63 and cross track 64 to S/T monitors and local home receivers along the alerted track. Alert 63 is received as RF alert 49 in the adjacent S/T. Signal 64 is received as RF across line 50.

Mode 2 logic provides a transmitter enabling signal 65, an antenna switching signal 66, together with a modulator control signal 67 to code the transmitter 56 with storm alert present tone 68 and transmits the alert along track 63 only.

Figure 9:
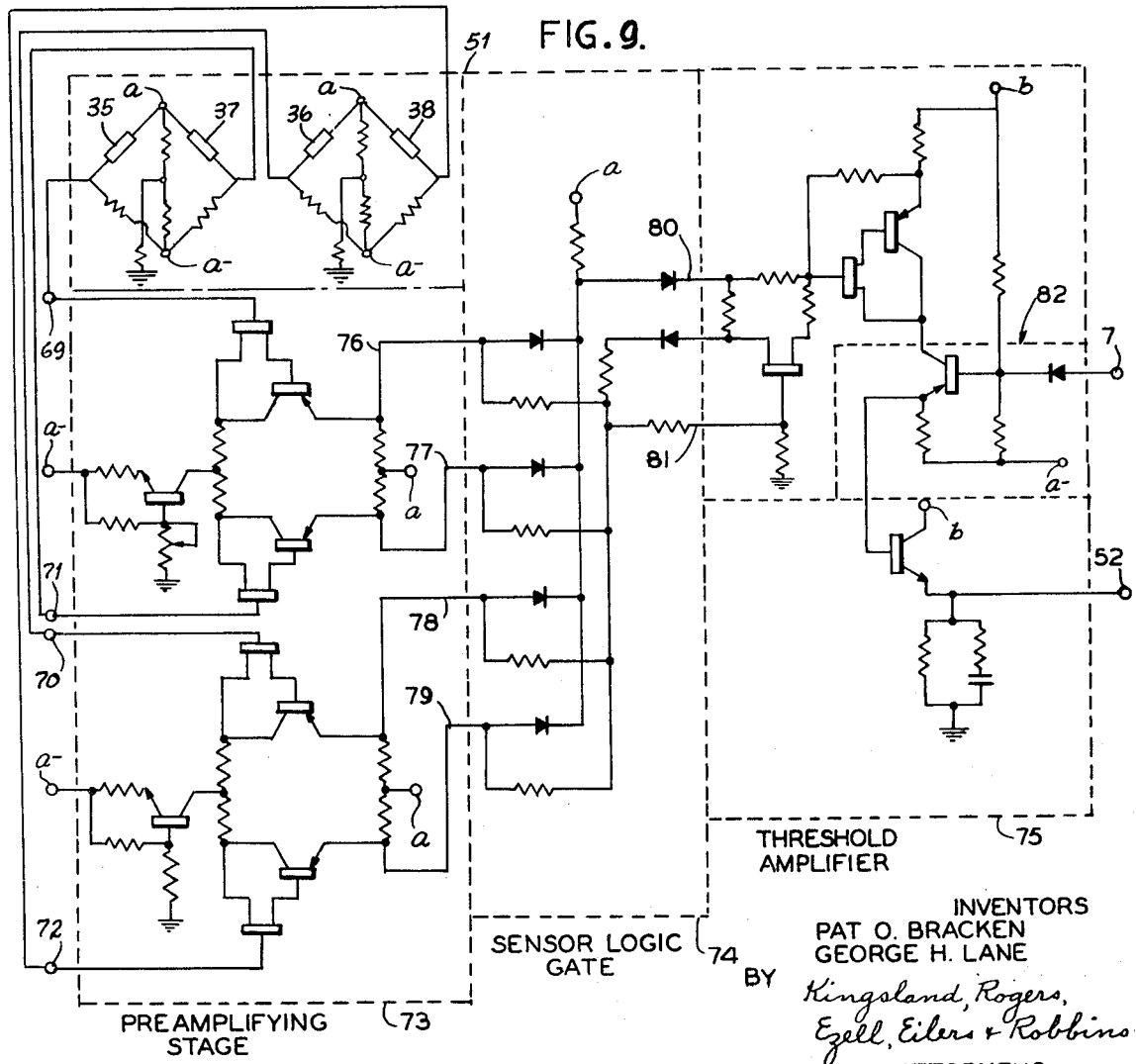
FIG. 9 is an electronic diagram of the signal conditioning system.

FIG. 9 illustrates the electrical implementation of the sensor signal conditioning system 51 and threshold amplifier 75. The signal conditioning system 51 comprises a preamplifying section 73 and a logic section 74 which is that part of the storm detection system which converts to electronic measures the wind velocity in the four strain gage bridge network 35, 36, 37 and 38. The strain gage output signals 69, 70, 71 and 72 are processed through a preamplifying stage 73, a sensor logic gate 74 and a threshold amplifying device 75.

The preamplifying stage 73 enhances the signal strength of the strain gage outputs 69, 70, 71 and 72 and directs them to the sensor logic input 76, 77, 78 and 79 at sensor logic gage 74 which sums the signals 76, 77, 78 and 79 in the resistor diode network to produce two control signals 80 and 81. These control signals 80 and 81 then drive the threshold amplifying device 75 which is biased to activate at an electrical level set for the critical wind velocity. The threshold amplifier is enabled through a transistor gate 82 which is controlled by barometric pressure signal 7 of the pressure transducer. The barometric pressure transistor gate 82 is activated by the strength of the signal generated by pressures critical for heavy storm conditions. The plenum chamber configuration output from transducer 13 is connected to input 80 of the threshold amplifier 75; 73 and 74 are not used in the plenum chamber configuration.

When both wind sensor and static pressure signals have exceeded their respective threshold levels, the total alert discrete 52 is produced. An illustration of the total alert discrete 52 is shown in FIG. 10.

The alert signal output is shaped to minimize false alarms and also to hold the alarm in for a minimum of time. As shown, when the discrete is up a time $\Delta t$ must be surpassed before the trigger level of the transmitter logic is reached.

Once that level is reached, the system is switched to the transmitter mode 1 and remains there until the total discrete is down. Transmitter logic is reset when total alarm time is $(T_R - \Delta t) + \Delta t_2$.

Figure 11:
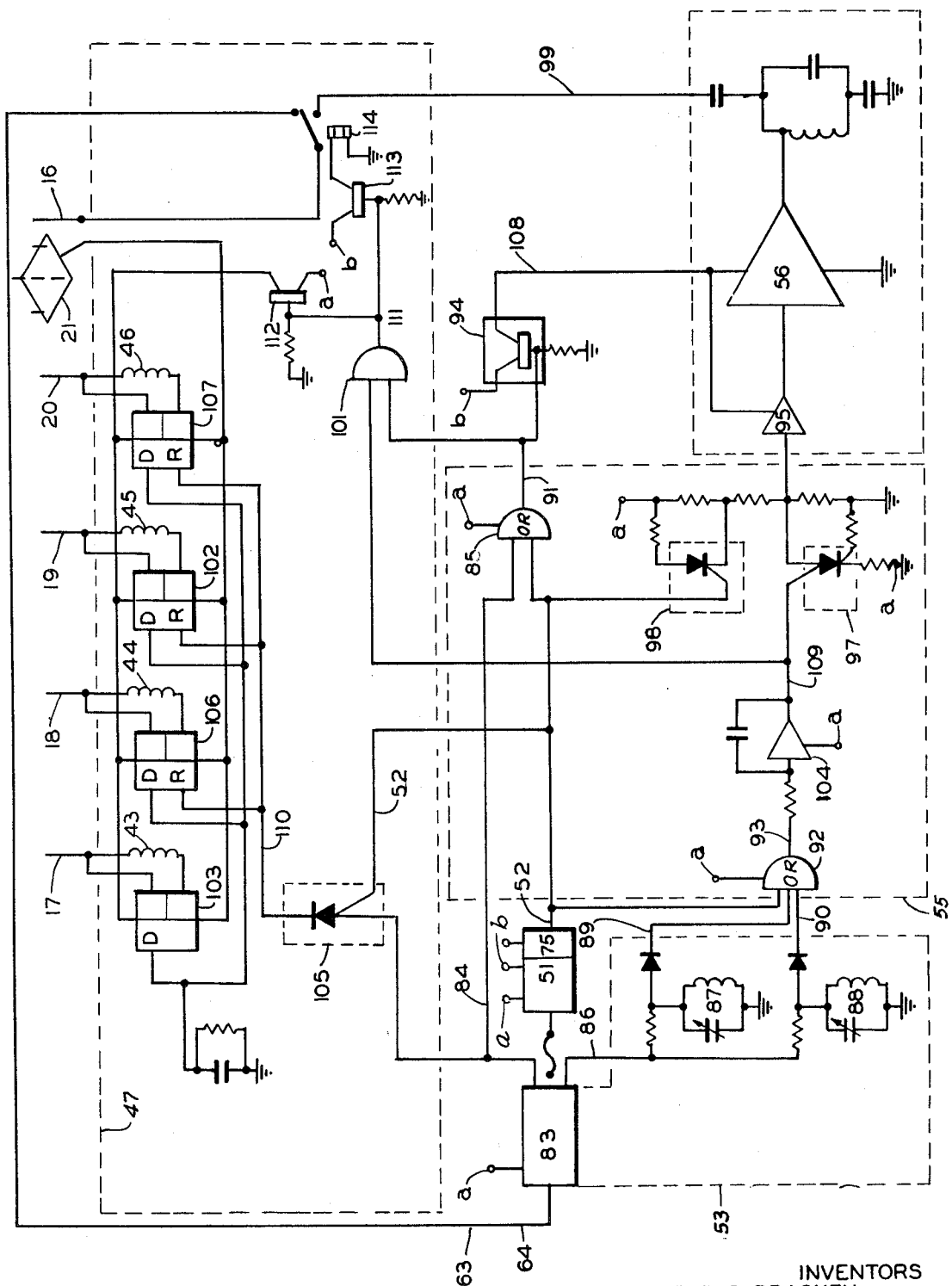
FIG. 11 is an electronic schematic view of the sensor transmitter.

An implementation of the alert signal processing is shown in FIG. 11. The RF receiver 83 detects and amplifies radiated storm present RF relay alerts from either along track 63 or cross track 64 transmissions as shown in FIGS. 8 and 12. The RF signals 63 and 64 are processed in RF receiver 83 to produce demodulated keying signals 84 and 86.

The dynamic storm conditioner or sensor 51 processes the storm present condition signal and outputs a discrete signal 52. Both the demodulated RF key 84 and the storm present discrete 52 inputs 'OR' element 85 resulting in an 'OR'd output 91. Output 91 provides inputs to power switch 94 and to 'AND' logic element 101. The resulting output 108 from power switch 94 enables transmitter 56 and modulator 95. RF key 84 also provides an input to antenna logic switching element 105 resulting in an output 110 which drives the R (reflectors) input to logic gate elements 102, 106 and 107. The enable signal 110 will set gates 102, 106 and 107 to render antenna parasitic elements 18, 19 and 20 reflectors with respect to driven antenna element 16 of the antenna array.

The demodulated output 86 inputs both tone detector networks 87 and 88. The resulting output levels 89 and 90 are voltages resulting from the tone detectors processed and input 'OR' logic element 92. When the threshold level of 92 is reached, output 93 results. Thus, 93 is then processed in electronic integrator 104. The resulting output 109 drives electronic switch 97 and enables a second input to 'AND' logic element 101.

When output 109 is present at switch 97, modulator 95 is enabled and will provide a 'storm alert present' modulation signal to transmitter 56.

When both enabling signals 109 and 91 are present at logic element 101 an out signal 111 results. This signal 111 drives power switches 112 and 113.

Power is provided through 112 to antenna logic elements 102, 103, 106 and 107. Power switch 113 supplies power to relay coil 114 causing the relay to switch the driven antenna 16 from the normally closed (NC) receiving condition 63 and 64 to the transmitting condition 99. Parasitic antenna element 18, 19 and 20 are switched to operating as reflectors when power switch 112 is activated. Element 17 does not switch.

The system remains in the transmitting mode 63 as shown in FIG. 12, until integrator 104 output 109 drops below the 'AND' logic element 101 threshold level, at this point, the system reverts to receiving mode 63, 64 and 64a shown in FIG. 12. Alert discrete signal 52 from storm sensor component 51 inputs four logic switching elements; antenna logic switch element 105, 'OR' element 85, modulator tone switching element 98 and also 'OR' logic element 92.

The resulting function of signal 52 present at element 105 is to turn the switch off, thus, making parasitic antenna elements 18, 19 and 20 directors. The resulting operation of switching element 98 when 52 is present is "turn on," thus, changing the modulation frequency of 95.

Signal 52 also inputs to 'OR' logic element 92 providing operation as before; a) resulting in signal 93 which enables the modulator 95 through switch 97; b) switches the driven antenna element 16 to transmit through 'AND' element 101, power switch 113 and relay 114 and c) enables antenna switching element 102, 103, 106 and 107 through power switch 112.

The resulting transmission pattern shown in FIG. 12, 63, 64 and 64a is produced.

Figure 13:
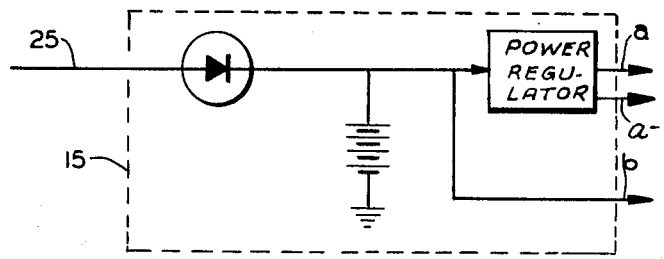
FIG. 13 is a functional block diagram of the S/T power system.

The proposed system will use DC power, most of it in the RF stage during the transmitting period. The design approach is directed to implementing an automatic system, therefore, a self contained power source is needed that will remain active during the system's dormant state. The necessary use of batteries over an extended period of time will also require the utilization of a recharging system. The power system 15 shown in FIG. 13, utilizes a trickle charge from utility power to maintain the battery. Referring to FIG. 13, output (*a*) and (*a*) is used for low level RF and the logic circuits, while output (*b*) is used for high level switching and transmitting power.

Figure 15:
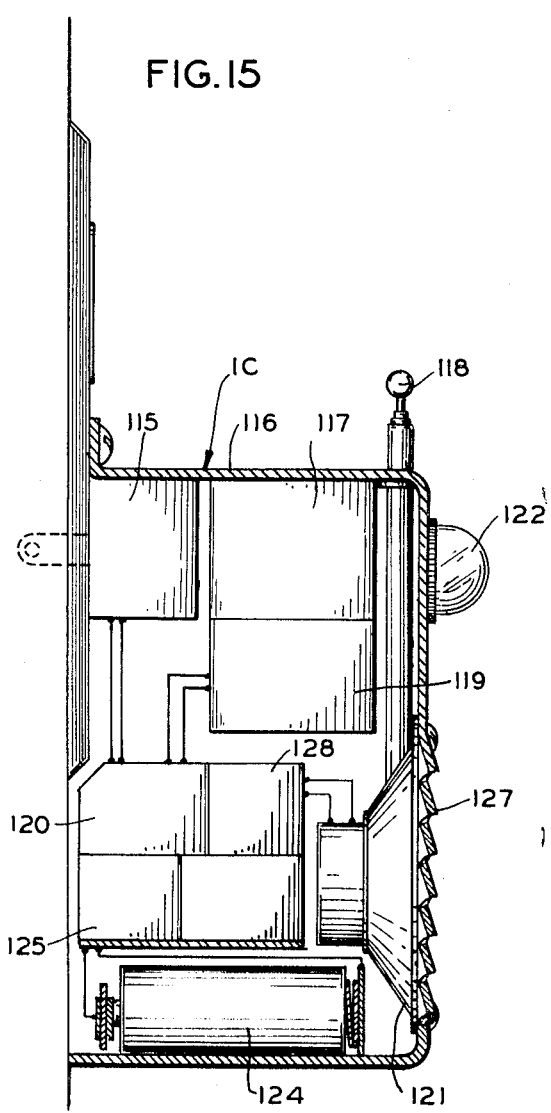
FIG. 15 is a sectional view in side elevation of the home receiver taken from the left side of FIG. 15.
Figure 14:
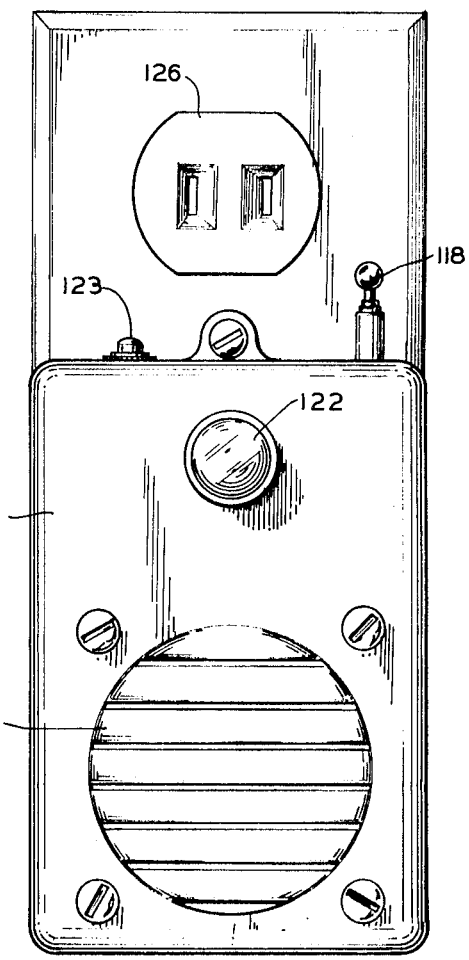
FIG. 14 is a view in front elevation of the home receiver.

FIGS. 14 and 15 show a typical receiver alarm unit 1B that is comprised of power inverter 115 that is permanently attached to the housing 116 that contains all of the components of the receiver alarm unit. These components comprise the FM receiver 117 that is also attached to the housing 116 and is connected to antenna 118, the logic control circuit 119, that sends the alarm signal discrete to the Audiovisual alarm generator circuit 120, that will produce a loud alarm noise through speaker 121 and energize the indicator light 122. The receiver alarm is provided with a test button 123 that can be used to verify proper operation of the unit and the alarms from the Audiovisual generator 120. Power is supplied by the self contained rechargeable battery 124 which is maintained in a charged condition by the power inverter 115 through the power supply 125. In the event that power is not available from the standard wall outlet 126, the battery 124 will provide the required power to activate this alarm. Louvers 127 are provided to direct the sound from speaker 121 when the antenna 118 senses the radiation of a sensor transmitter 1 that is broadcasting an alarm that is directed to the FM receiver 117. The signal is detected by receiver 117 and provides an output to the logic control circuit 119. In the presence of an alarm signal the logic control circuit 119 delivers an alarm discrete to the Audiovisual alarm generator 120 where an audible signal is produced and sent to speaker 121 and a visual alarm signal is sent to the indicator light 122. The alarm signals 121 and 122 will remain on for a predetermined time that is incorporated in the time delay 128 of the receiver alarm. Upon completion of this delay 128, the receiver alarm unit will reset to its original state.

Various changes and modifications may be made within this invention as will be readily apparent to those skilled in the art. Such changes and modifications are within the scope and teaching of this invention as defined by the claims appended hereto.

What is claimed is:

1. An atmospheric disturbance warning system for detecting an approaching atmospheric disturbance comprising atmospheric condition sensors and transmitters responsive to said sensors which are located in a grid pattern, said transmitters transmitting an alarm signal by radio frequency to a receiver which detects the radio frequency signal and activates an alarm, said transmitter providing the signals for activating adjacent grid track monitors and home alarm receivers, the transmitter modulations being used to provide alarm signals through a first circuit to transmit signals in the path of the approaching disturbance termed mode (1) and a second circuit to transmit signals in and across the path of the approaching disturbance termed mode (2).

2. The warning system as described in Claim 1 comprised of a logic section with a set of gates that determine the manner of transmission by selecting from the first circuit termed mode (1) storm present (storm activated) and the second circuit termed mode (2) storm alert present (radio frequency activated).

3. The logic section as described in claim 4 whereunder the mode (1) storm present (storm activated) condition, the transmitter will broadcast downline and crossline alarm signals to adjacent monitors.

4. The logic section as described in claim 4 whereunder mode (2) storm alert present (radio frequency activated) conditions the adjacent monitors will receive the transmitted alert and retransmit it down line.

5. The warning system of claim 1 in which the sensors and transmitters have the capability of providing a selection of radio frequency signals derived from frequency modulated carrier to alert home and other alarm receivers along the path of an approaching storm.

6. The warning system as described in claim 5 in which the said receiver alarm is self sustaining through a trickle charge to recharge batteries and consists of a logic control and an alarm generator, the said receiver section detecting the monitor alert signals and converting them into audio level signals.

7. The warning system of claim 1 in which the receiver section is made up of a radio frequency preamplifier, an intermediate frequency conversion strip and an audio signal detector, and the audio signal is then passed from the detector through a filter network which is tuned to output two separate coded audio alert signals into a logic "and" gate.

8. The receiver alarm as described in claim 7 in which when the two signals are present the "and" gate outputs a discrete to turn on an alarm generator, the alarm discrete also triggering a time delay latching circuit that maintains the alarm discrete for a finite time after the alert condition has been passed.

9. An atmospheric disturbance warning system for detecting an approaching atmospheric disturbance comprising atmospheric condition sensors and transmitters responsive to said sensors which are located in a grid pattern, said transmitters transmitting an alarm signal by radio frequency to a receiver which detects the radio frequency signal and activates an alarm, said alarm signals being transmitted in accordance with grid actuation logic which covers three parallel tracks centered at the initial detection point, said tracks paralleling the known local storm paths for the area, and adjacent parallel track monitors alerted by selected frequencies of the initial sensor transmitter monitor.